Jan. 27, 1953  J. PHYL ET AL  2,626,676
ELECTRICAL PRECIPITATION SYSTEM
Filed April 11, 1951  3 Sheets-Sheet 3

INVENTORS
J. PHYL
J. W. LENEHAN

BY: Stowell & Evans,
ATTORNEYS

Patented Jan. 27, 1953

2,626,676

UNITED STATES PATENT OFFICE 2,626,676

ELECTRICAL PRECIPITATION SYSTEM

Joseph Phyl, Fanwood, and Joseph W. Lenehan, Franklin Township, N. J., assignors to Research Corporation, New York, N. Y., a corporation of New York Application April 11, 1951, Serial No. 220,470

4 Claims. (Cl. 183—7)

This invention relates to an electrical precipitation system of the Cottrell type.

An object of the invention is to provide an electrical precipitation system in which ground or floor area is utilized in an economical and efficient manner by superimposing a plurality of precipitators one upon another. Such precipitators may be arranged for independent, parallel or serial gas flow and may be of various types.

Another object is to provide in such an electrical precipitation system apparatus for disposing of the precipitated dust in a convenient and simple manner.

Another object is to provide in a system of this type a construction that minimizes overall height of the precipitation system.

Still another object is to provide an electrical precipitation system of this character including a dust chute conveying collected dust from an upper to a lower precipitator while preventing flow of gas from one precipitator to another through the dust chute.

These and other objects of the invention are achieved in an electrical precipitation system having a lower precipitation chamber means including complementary discharge and extended surface electrodes and inlet and outlet means directing a stream of gas through the chamber; an upper precipitation chamber means positioned superjacent to said lower chamber means, said upper chamber including complementary discharge and extended surface electrodes and inlet and outlet means directing a stream of gas through said upper chamber; a first dust collecting hopper positioned above said lower chamber and below said upper chamber and communicating with the latter for receiving dust removed from the electrodes of the upper chamber; a second dust collecting hopper positioned below said lower chamber and communicating therewith for receiving dust removed from the electrodes of the lower chamber; and a dust chute extending between said first and second hoppers for conveying dust from said first to said second hopper.

For a fuller understanding of the invention, reference is made to the accompanying drawings and the following description thereof. In the drawings.

Figure 1:
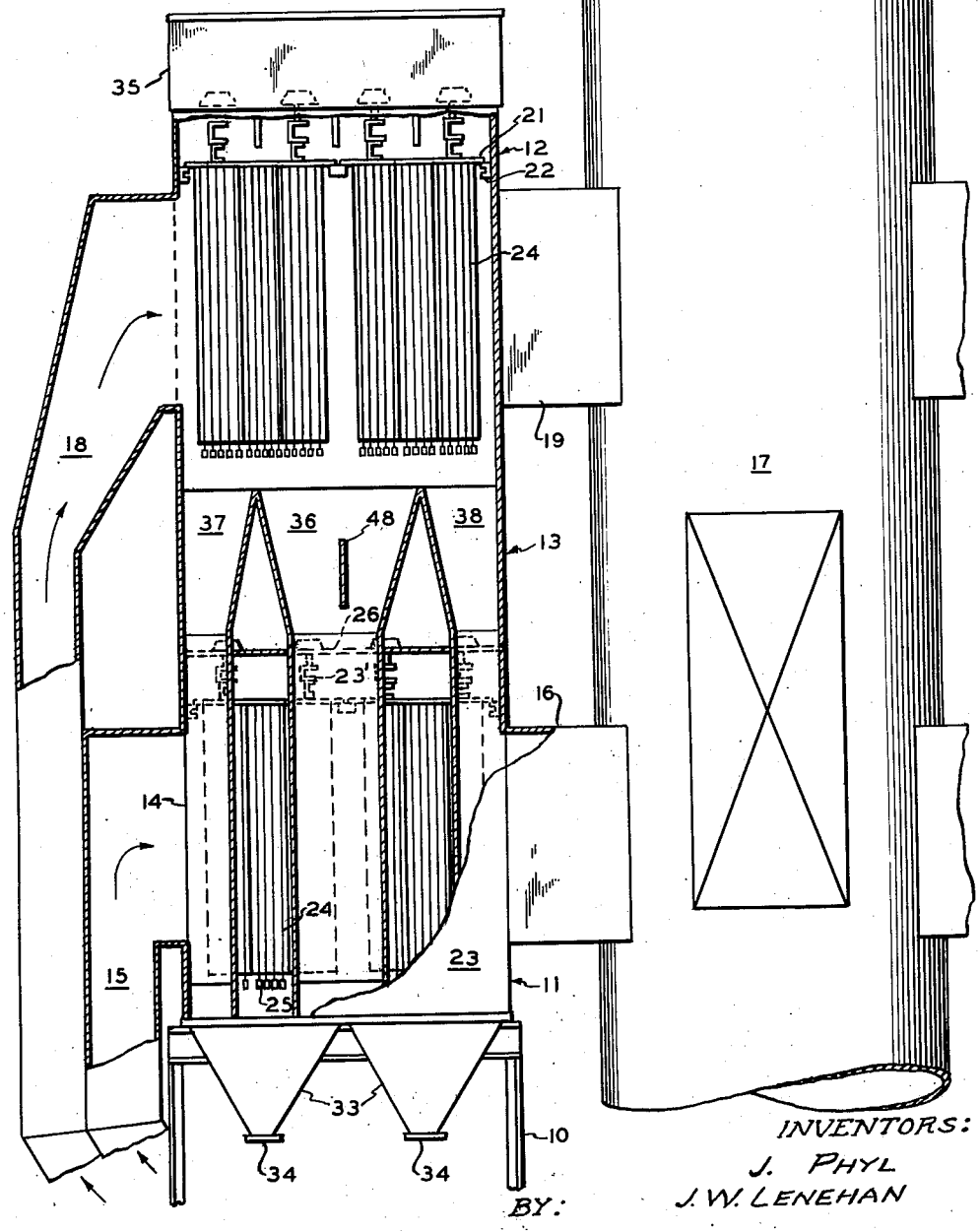
Fig. 1 is a vertical sectional view through an electrical precipitation system in accordance with the invention.
Figure 2:
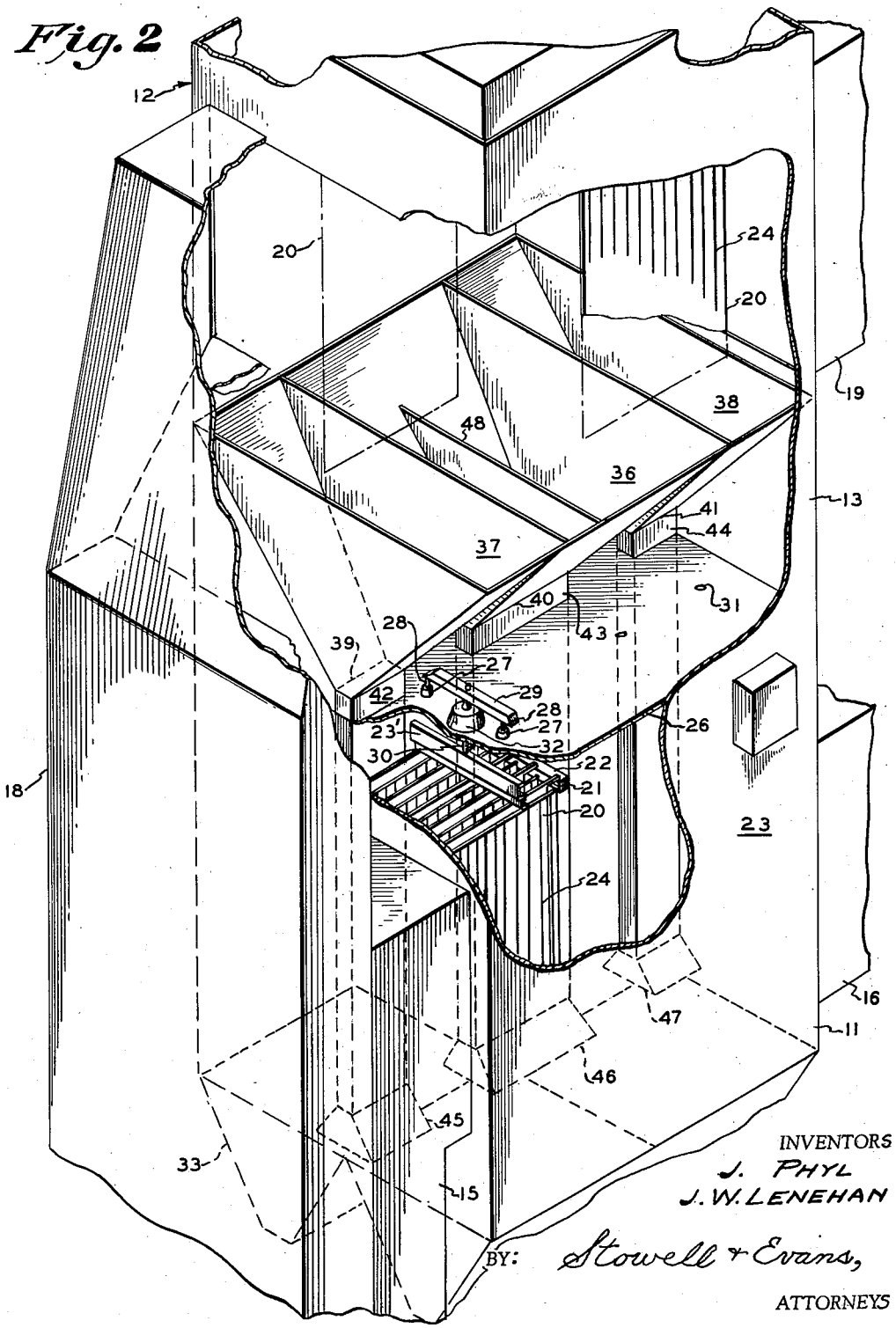
Fig. 2 is an isometric view of the precipitation system of Fig. 1, parts of the casing being broken away to show interior construction.

Referring to the drawings, particularly to Figs. 1 and 2; the electrical precipitation system shown has a base frame 10 supporting a pair of electrical precipitators 11 and 12 arranged in superimposed relation. Intermediate the lower precipitator 11 and the upper precipitator 12 is a compartment designated by the general reference numeral 13. Gas to be cleaned, as for example boiler flue gas, is introduced into the lower precipitator through an inlet opening 14 communicating with a flue 15. Cleaned gas from the precipitator 11 passes through a duct 16 to a stack 17.

Similarly, flue gas from the same or another boiler is conducted to the upper precipitator 12 through a flue 18 and exhausted therefrom through a duct 19 to the stack 17.

As shown, the lower precipitator 11 is of the horizontal gas flow type having the usual collecting electrodes 20 in the form of spaced plates disposed parallel to the direction of gas flow in the precipitator. These plates are supported by lugs 21 secured to transverse beams 22 carried by the housing 23. The plates provide therebetween a plurality of parallel gas ducts in which are suspended from an insulated framework 23' parallel curtains of high tension discharge electrode wires 24. The wires are tensioned by weights 25 attached to the lower ends of the wires.

A horizontal roof plate 26 defines the top of the precipitation chamber of the lower precipitator 11. On this roof plate are insulated supports for the high tension electrode frames. One such support, as shown in Fig. 2, has a pair of insulators 27 carried by the roof plate and provided with vertical struts 28. A horizontal bar 29 is mounted on the struts 28. A hanger rod 30 depends from the center of the bar 29, extends through a hole 31 in the roof plate into the lower precipitation chamber and is attached to the frame member 23' to support the latter. An insulating bushing 32 provides a collar for the rod 30 where it extends through the roof plate.

The lower precipitator 11 is divided into two parallel sections and each section has two serially arranged sets of complementary electrodes. Beneath each set of electrodes is a hopper 33 positioned to receive dust or fly ash dislodged from the electrodes by any conventional electrode vibrating or scraping device. Dust is removed from the hoppers 33 as it accumulates through discharge openings 34 at the bottom of the hoppers.

The system of electrodes in the upper precipitator 12 is similar to that described hereinbefore. An insulator compartment 35 houses the high tension electrode supporting structure for the upper precipitator.

In the compartment 13 below the upper precipitation chamber is a system of dust receiving hoppers into which falls dust dislodged from the electrodes of the upper precipitator. Three hoppers are shown. The central hopper 36 has a top opening area about twice as large as the areas of the top opening of either of the end hoppers 37 or 38. The sides of the hoppers converge to bottom outlets 39, 40 and 41 communicating with dust chutes 42, 43 and 44 that extend downwardly through holes in the roof plate 26, and through the precipitation chamber to the flared mouths 45, 46 and 47 positioned to discharge dust into the hoppers 33 of the lower precipitator. The discharge mouths of the dust chutes are located close to the tops of hoppers 33, below the electrodes of the lower precipitator and below the gas stream flow path therein, and in a relatively quiescent zone in order to minimize or prevent reentrainment in the gas stream of dust issuing from the chutes.

The upper central hopper 36 may have a transverse septum 48 that directs dust from the upper leading sets of electrodes into the hoppers 33 adjacent the gas inlet end of the precipitator and directs dust from the upper following sets of electrodes into the hoppers 33 adjacent the gas outlet end of the the precipitator. This septum may extend down through the central dust chute 43, if desired.

It will be seen that the dust chutes occupy a minimum of space in the lower precipitation chamber and provide, in effect, a central partition dividing the lower precipitator into two parallel sections. Auxiliary baffles (not shown) may be positioned between the dust chutes to provide a solid partition between the two sections of the lower precipitator.

In the construction of the invention, vertical space or headroom is conserved by locating both the upper dust hoppers and the lower high tension electrode insulators in a single compartment 13. Horizontal area is also conserved by superimposing one precipitator upon another. The problem of removing collected dust from the upper precipitator is solved advantageously.

It is apparent that the upper and lower precipitators may be arranged for serial flow of gas or may be constructed to operate on gas from independent sources such as separate boilers.

Figure 3:
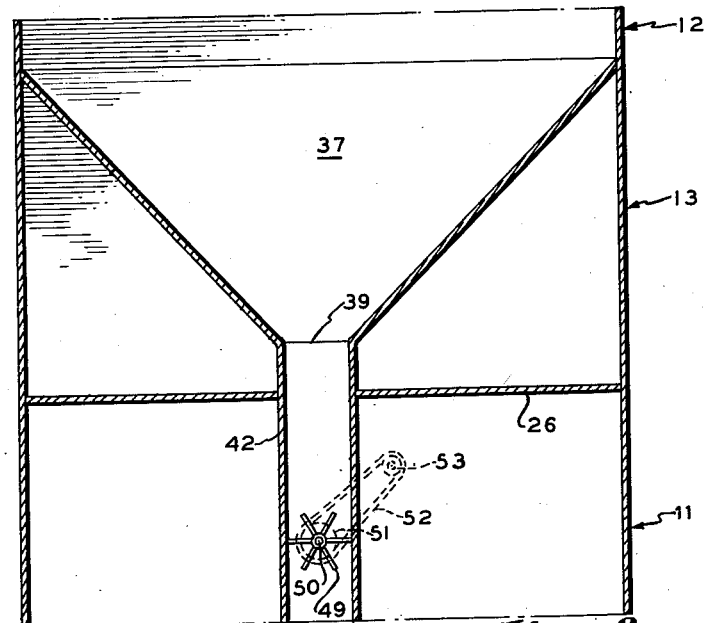
Fig. 3 is an enlarged sectional view of a portion of a dust hopper and dust chute arrangement used in the apparatus of Figs. 1 and 2.

Since it often happens that gas pressure differs in the two superimposed precipitators, it may be desirable to provide a device for preventing flow of gas from one precipitator to the other through the dust chutes. One such device is shown in Fig. 3 in which the lower precipitator is designated by the numeral 11, the upper precipitator by the numeral 12, and the intermediate compartment by the numeral 13. The dust chute 42 of the hopper 37 has located therein a star valve 49 mounted on a shaft 50 journalled in the walls of the chute. The shaft has a pulley 51 external to the chute driven by a belt 52 from a driving wheel 53. In operation, the valve 49 is rotated to pass dust downwardly through the chute while preventing any substantial flow of gas through the chute in either direction.

Figure 4:
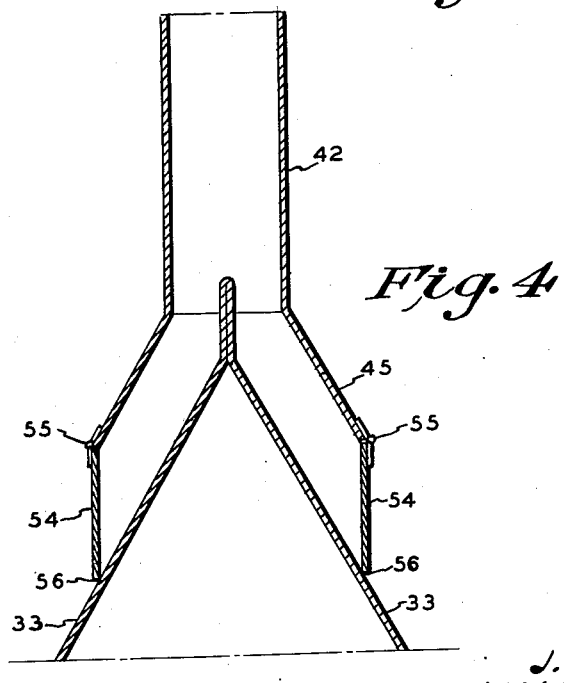
Fig. 4 is a view of another form of dust hopper and dust chute arrangement.

While gas pressure in the lower precipitator is higher than in the upper precipitator, flow of gas up the chutes may be prevented by the device of Fig. 4. At the flared discharge mouth 45 of the chute 42 are located flap valves 54. These valves are hinged at 55 to the lower edges of the discharge mouth and normally hang with their bottom edges 56 resting against walls of the lower hoppers 33. Dust descending in the chute falls against the inner faces of the valve flaps 54 and opens them against differential gas pressure to allow the dust to fall into the lower hoppers. The flaps thereafter close to prevent gas from flowing from the lower precipitating chamber into the chute.

The star valve construction of Fig. 3 and the flap valve construction of Fig. 4 may be separately or conjointly used if desired.

We claim:

1. An electrical precipitation system for treating gases in at least two separate parallel gas streams comprising a lower precipitation chamber, and an upper precipitation chamber superjacent to said lower precipitation chamber, means including complementary discharge and extended surface electrodes in said upper and lower precipitation chambers, horizontal gas inlet and outlet means for each of said precipitation chambers, first conduit means directing a portion of the gas to be cleaned to the gas inlet means of the lower precipitation chamber, second conduit means parallel to said first conduit means directing a second portion of the gas to be cleaned to the gas inlet means of the upper precipitator chamber, a compartment intermediate said lower and upper precipitation chambers, a first dust collecting hopper positioned in said compartment and communicating with the upper precipitation chamber, a second dust collecting hopper positioned below said lower precipitation chamber and communicating therewith, and a dust chute extending between said first and second hoppers for conveying dust from said first to said second hopper.

2. The invention as defined in claim 1 including valve means in said dust chute substantially blocking flow of gas therethrough while permitting passage of dust therethrough.

3. The invention as defined in claim 1 wherein said chute extends through said second chamber.

4. The invention as defined in claim 1 wherein insulator means are positioned in said compartment and support the high tension electrodes of said lower precipitator chamber.

JOSEPH PHYL.
JOSEPH W. LENEHAN.

REFERENCES CITED

The following references are of record in the file of this patent:

UNITED STATES PATENTS

| Number | Name | Date |
|---|---|---|
| 411,327 | Donnald | Sept. 17, 1889 |
| 1,444,384 | Patitz | Feb. 6, 1923 |
| 1,790,961 | Welch | Feb. 3, 1931 |

FOREIGN PATENTS

| Number | Country | Date |
|---|---|---|
| 445,258 | Great Britain | Apr. 6, 1936 |
| 662,383 | Germany | July 12, 1938 |